Jan. 19, 1932.  E. J. TE PAS  1,842,329
THERMOSTATIC VALVE FOR WATER HEATERS
Filed April 21, 1928
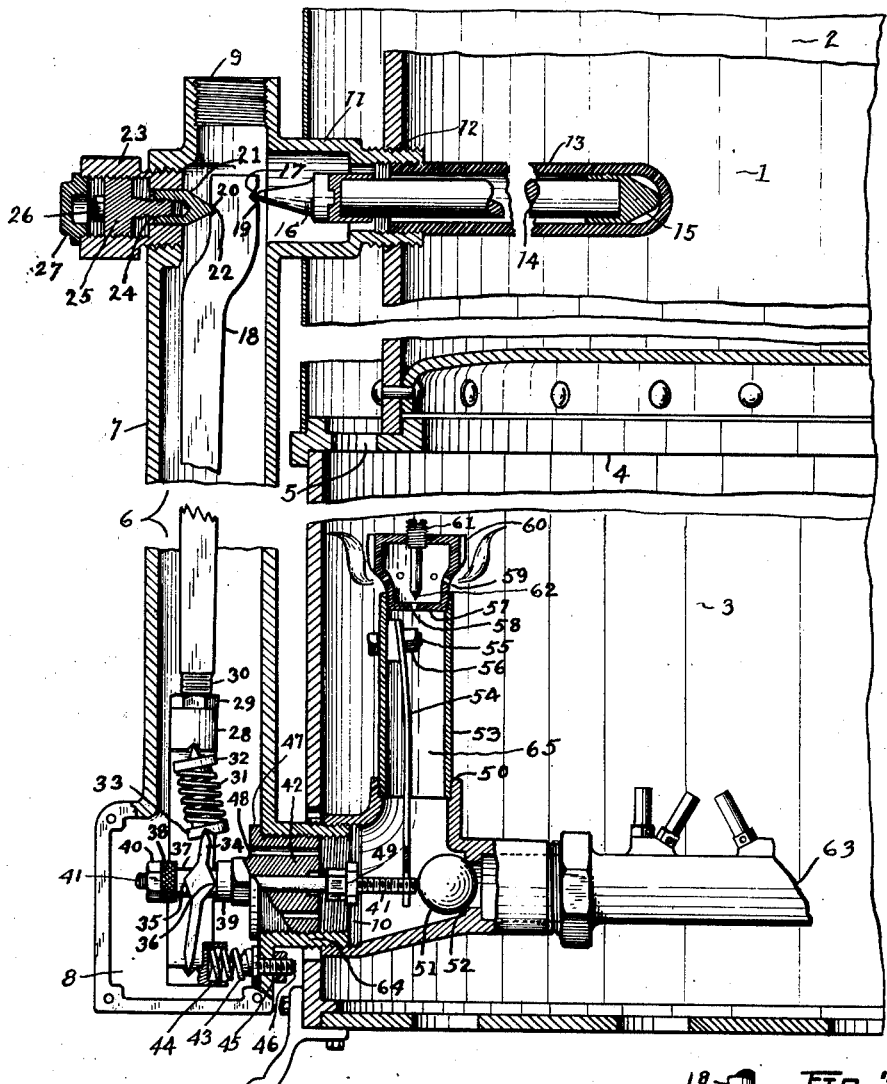

Patented Jan. 19, 1932

1,842,329

UNITED STATES PATENT OFFICE

EDMUND J. TE PAS, OF LAKEWOOD, OHIO, ASSIGNOR TO THE PATROL VALVE COMPANY, OF CLEVELAND, OHIO, A CORPORATION OF OHIO

THERMOSTATIC VALVE FOR WATER HEATERS

Application filed April 21, 1928. Serial No. 271,799.

This invention relates to gas burning appliances and in particular, automatic controls for the purpose of safely controlling the operation of such appliances.

Prior to my invention it has been the usual practice to control the operation of the burner of a gas appliance, such as a storage automatic water heater, by means of a thermostatic valve that is responsive to the temperature of the water in the storage vessel. Thus when the temperature of the water drops below a certain point the thermostatic valve opens and admits gas to the main burner.

Ignition means for the burner usually comprise a constantly burning pilot. In the presence of such a pilot flame the gas issuing from the main burner is ignited and serves to raise the temperature of the water to a predetermined point, whereupon the thermostatic valve closes, shutting off the supply of gas to the main burner and prevents further heating of the water.

In this type of arrangement where the gas is automatically turned on and off and where a pilot light is depended upon for ignition there is the possibility of a hazardous condition arising upon the event of extinguishment of the pilot and subsequent escape of unburned gas from the main burner.

Efforts to obviate this hazardous condition have in general resulted in the provision of an additional thermostatic valve in the gas line, under control of the pilot light, so that if the pilot light should become extinguished the thermostatic valve controlled thereby would close and cut off the admission of gas to the main burner.

There are several types of thermostatic valves or safety pilots on the market today. These valves differ structurally but their function and purpose is the same. Their purpose is to prevent the admission to and the escape of raw gas from the main burner when the pilot light is not burning.

One of the objects of this invention is to provide in an appliance of the type described, a gaseous fuel control valve that is responsive to the temperature of the liquid that is being heated and which is independently controlled by the heat of a constantly burning ignition pilot.

Another object of this invention is to provide in a single control valve, opening and closing means actuated by the temperature of the fluid that is being heated and independent closing means actuated by a thermostatic pilot.

Another object of my invention is to provide a highly sensitive thermostat having a non-metallic expansion tube.

Another object of my invention is to provide in a water heater of the type described a highly sensitive, quick-acting, rugged thermostat.

Another object of my invention is to provide a gas burner control for water heaters that is fully automatic in its operation, having inbuilt safety features, and which is simple and inexpensive to construct and install.

Another object of my invention is to provide a simple, inexpensive thermostatic pilot light, that is operatively associated with the main burner supply valve and that prevents the admission of gas to the main burner under predetermined conditions.

In general my invention contemplates replacing two valves namely, the tank thermostat and the safety pilot, by a single valve under the joint control of the temperature of the liquid contents of the storage tank and the heat of a pilot light; providing a simple, safe and effective means of controlling the gas flow of a storage automatic water heater.

By this construction a great many parts are eliminated, resulting in a greatly simplified device that is not apt to become inoperative through wear or breakage.

The number of parts requiring adjustment is very small. This should materially cut down the production assembly costs as well as reducing servicing after the device has reached the hands of the consumer.

An important advantage of this control is the high factor of safety incidental to its operation. It is impossible to turn on the main burner gas supply without first providing a pilot flame for its ignition.

The present invention includes certain features common to my copending applications Serial Nos. 160,747, filed January 12, 1927, and applications 271,801, 271,802, and 271,803 filed by me April 21, 1928, as well as application Serial No. 3,333 filed by L. F. Doen January 19, 1925, and application Serial No. 123,561 filed by W. J. Snow, and such common features are hereby disclaimed in the invention to which the present application relates.

Referring to the drawings wherein one form of my invention is illustrated: Fig. 1, is a sectional elevational view in part, of a storage automatic water heater of the internal fired type. Fig. 2 is an end elevational view of the thermostat lever knife edge bearing. Fig. 3 is a side elevational view of the snap action mechanism. Fig. 4 is a plan elevational view of the pilot burner body.

Fig. 1, shows in part a storage automatic water heater comprising a tank 1, enclosed by casing 2 and carried on an annular ring 4. The annular ring 4 rests upon a cylindrical base 3, which defines the combustion of space of the burner 63 and furnishes the housing for the same. The annular ring 4 is provided with a series of holes 5 for the passage of the heated products of combustion from the main heating burner 62.

The liquid contents of the tank 1 are directly heated by the products of combustion from the burner 63. The heated gases from the burner leave the combustion chamber by way of openings 5 and then pass upwardly in the space between the tank 1 and casing 2 and in close contact with the tank 1, until they reach its top where they are conducted to a flue or chimney, not shown.

For the automatic control of the temperature of the liquid contents of the tank, I provide a thermostat 6, which comprises the thermostat housing 7, having an inlet 9 and an outlet 10. The inlet 9 is adapted to be placed in communication with a source of gas supply. The extended portion 11 of the housing 7 is externally threaded at 12 for reception in the tank 1. The projection 12 is internally threaded for the reception of a thermostat tube 13, which is made of a material having a high coefficient of thermal expansion. In the present instance the tube 13 is made of a hard rubber composition or vulcanite.

Carried within the tube 13 is a rod 14 of a material having a low coefficient of expansion, such as procelain or carbon. Bearing caps 15 and 16 are provided for the ends of the low expansion rod 14. The cap 16 has a knife edge 17, which is received in the slotted portion 19 of the compounding lever 18. Opposite to the bearing 19 a similar bearing 20 is formed in the lever 18.

The second bearing 20 co-acts with the adjustable lever bearing 21 having a knife edge 22 which serves as an adjusting means for the lever 18. The lever bearing 21 is slidably and non-rotatably mounted in the bushing 23. The bushing 23 is drilled and tapped for reception of the differential adjusting screw 25, which has an externally threaded reduced portion 24, which is received in a suitably threaded hole in the bearing member 21. The adjusting screw 25 has a wrench engaging extension 26 to facilitate its adjustment.

It is apparent that with the elements assembled as shown in Fig. 1, turning of the adjusting screw 25 will cause the knife edge 22 to move an amount which is proportional to the ratio of the threads on the reduced and enlarged portion of the adjusting screw 25. A closure cap 27 is provided for the bushing 23.

A snap action mechanism support 28, is internally threaded at one end and receives therein the lower threaded end 30 of the compounding lever 18. The lock nut 29 serves to hold the support 28 in the desired position. The snap action mechanism consists of a pair of oscillating levers, one of which 34, is rigid and the other of which is expansible. The expansible lever consists of a coil spring 31 which is provided with suitable abutments 32 and 33 which respectively make a line contact with the upper end of the snap action carrier 28 and the upper end of the rigid oscillating lever 34.

The rigid oscillating lever 34 is provided at about one-third the distance from its top with contacting edges 35 and 36, which are respectively adapted to contact with the knurled disk 38 in one position of the mechanism and with the disk 39 in the opposite position of the mechanism.

The lower end of the snap action carrier 28 has a spring cage 44 formed thereon. The cage 44 receives and supports a spring 43, which at its opposite end is carried upon an adjusting screw 46. The spring adjusting screw 46 is locked in the desired adjustment by the nut 45.

The valve stem 41 is journaled in the valve stem guide block 42 and it is provided at its inner end with adjusting nuts 49. The guide block 42 has a shoulder 47 adapted to contact with side of the lever housing 7 and is further provided with drilled ports 48 for the supply of gas to the burner 63. The opposite end of the valve stem is provided with a lock nut 40 which engages the knurled disk 38. The snap action lever 34 straddles the spacing sleeve 37. This sleeve is internally threaded for application on the valve stem 41 and has circumferentially enlarged portions, formerly referred to as disks 38 and 39, with which the contacting edges 35 and 36 of the oscillating lever 34 make engagement.

The lower end of the compounding lever housing 7 is provided with an opening 8 to facilitate the assembly of the enclosed mechanism and it is adapted to be covered by a suitable cover plate not shown. The lateral extension 64 of the housing 7 is adapted for reception of a T shaped pipe fitting. A valve seat 52 is formed in this fitting. The T fitting is internally threaded at 50 for the reception of the pilot burner tube 53 and is externally threaded at its outlet end for the reception of the main heating burner 63. A sphere or ball 51 co-acts with the valve seat 52 to control the flow of gas to the burner 63. A strip of thermostatic metal 54 is secured to the upper end of the pilot tube 53, by a bolt and nut 55 and 56 respectively. The thermostatic metal 54 is of the conventional construction in which a strip of brass is suitably welded or bonded to a strip of Invar steel, so that the composite strip formed thereby has the property of changing its shape with changes in its temperature.

A burner cap 57, having a central orifice 58, is externally threaded for reception in the tube 53. The cap 57 has a series of lateral orifices or burner ports 59. It is further provided with vertical radiation fins 60 to hasten the heating or cooling of this element. An adjusting needle 61 cooperates at its tapered end 62 with the orifice 58 to control the flow of gas to the burner ports 59.

Referring particularly to the thermostatic pilot 65, when this pilot is in operation and hot, the thermostatic metal 54 assumes the position shown in Figure 1. Upon extinguishment of the pilot light the pilot burner and associated thermostatic strip 54 start to cool and in a short time the strip 54 is in contact with the sphere 51 forcing it against its seat 52 and preventing the admission of gas to the main heating burner 63.

Upon relighting the pilot and the consequent heating thereof, the thermostatic metal again assumes the position shown in Fig. 1 and the valve operating mechanism, controlled by the tank thermostat, is free to open or close the valve defined by the ball 51 and seat 52.

Fig. 1 shows the thermostat in valve closing position, a condition which would occur when the water in the tank becomes heated above a predetermined temperature for which the thermostat is set. When cooling of the water in the tank 1 takes place, the differential contraction of tube 13 and rod 14 will cause the bearing cap 16 to move to the left.

This movement causes the lower end of the compounding lever 18 to swing to the right about the fulcrum point 22. Following this movement it will be seen that the oscillating levers of the snap action mechanism are gradually moved to the position where they are in line and upon further movement they pass their dead center position and snap to their extreme left-hand position. This movement of the snap action mechanism brings the contacting edges 35 into engagement with the knurled disk 38 and snaps the valve stem 41 to its extreme left hand position leaving the ball 51 free to fall away from its seat and admit gas to the main burner 63.

From the description of the operation of the thermostat as just stated, it will be seen that upon this operation of the tank thermostat and its associated elements, if the pilot light is burning, gas will be admitted to the main burner. However, should the pilot light have been extinguished some time prior to the operation of the thermostat 6 the thermostatic strip 54 would hold the sphere 51 in engagement with the valve seat 52. By this construction and arrangement it is impossible to admit gas to the main burners, except at such times as when an ignition pilot flame is present.

As the temperature of the water increases the bearing cap 16 moves to the right. This permits the compression spring 43 to move the free end of the compounding lever to the left and when this lever has moved the oscillating levers of the snap action mechanism past their dead center or in-line position they snap to the right bringing the edges 36 of the lever 34 into engagement with the disk 39 shifting this disk and the valve stem 41 upon which it is rigidly mounted to the right. By this action the inner end of the valve stem 41 is brought into contact with the sphere 51 urging it against its seat 52 and cutting off the gas supply to the burner 63.

It will be noted in the operation just described that the gas supply to the main burner is under control of the tank thermostat and the thermostatic pilot light. Under normal conditions when the pilot light is burning the tank thermostat opens and closes the gas supply to the main burner in accordance with the temperature of the liquid which is being heated. In the event of extinguishment of the pilot light the gas supply to the burner is cut off and the operation of the tank thermostat can not effect the flow of gas to the main burner until the pilot light is relighted.

A control of the above type could be readily applied to a great many gas burning appliances where the operation of the main burner is automatically controlled by the temperature of the medium which is being heated. In the present instance the water heater shown in the drawings was selected for the purpose of illustrating the manner in which my improved control operates and it is not intended to limit the use of this control to gas fired water heaters.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. A thermostatic gas burning pilot light comprising, a valve body having a valve seat formed therein, a valve head cooperating with said valve seat to control fluid flow therethrough, a vertical pilot tube carried on said valve body, a thermostatic member mounted in said vertical tube and adapted to control the operation of said valve head, a burner head carried on the upper end of said pilot burner tube having a series of burner ports, outwardly extending fins positioned between successive burner ports and means cooperating with a gas inlet orifice formed in said burner head to control the flow of gas to said burner ports.

2. An automatic control for a gas fired liquid heater comprising, a thermostat housing having gas inlet and outlet openings formed therein, a thermostatic member carried by said housing, a storage tank having an opening for reception of said thermostatic member, a compounding lever operatively connected to said thermostatic member, a valve body mounted on the outlet end of said housing having a valve seat formed therein, a freely mounted floating valve head cooperating with said valve seat to control fluid flow therethrough, means operatively carried on said lever and associated with said valve head to impart a snap action motion thereto.

3. An automatic control for a gas fired liquid heater comprising, a thermostat housing having gas inlet and outlet openings formed therein, a thermostatic member carried by said housing, a storage tank having an opening for reception of said thermostatic member, a valve body having a valve seat formed therein and carried by said housing, a freely mounted floating valve head cooperating with said valve seat, a compounding lever adjustably mounted in said housing and operatively associated with said thermostatic member and said valve head, a vertical pilot burner mounted on said valve body.

4. An automatic control for a gas fired liquid heater comprising, a housing having gas inlet and outlet openings formed therein, a thermostatic member carried by said housing, a storage tank having an opening for reception of said thermostatic member, a valve body carried by said housing, a valve seat formed in said valve body, a loosely mounted sphere cooperating with said valve seat to control fluid flow through said valve body, a compounding lever operatively associated with said thermostatic member and said sphere, a thermostatic ignition pilot burner carried by said valve body, and a thermostatic element housed within said pilot burner to independently control the operation of said sphere.

5. A thermostatic valve comprising a pilot burner having a vertically disposed fuel conducting tube, a ported burner head in communication therewith provided at the upper end of said tube, a thermostat in said tube positioned wholly below said burner head and responsive to heat conducted therefrom, fuel control means within said burner head and located above said thermostat, and valve means operatively associated with said thermostat.

6. A thermostatic valve comprising a ported valve body with inlet and outlet passageways, a pilot burner having a fuel conducting tube in communication with the inlet side of said body, a cap for said tube formed from a hollow member having a port adapted for communication with said tube and having flame supporting orifices thereby supplied with fuel, adjustable means cooperating with said port for regulating the flow of fuel therethrough, a thermostat in said tube, and a valve member operatively associated with said thermostat for controlling fluid flow from the outlet passageway of said valve body.

7. A thermostatic valve comprising a ported valve body with inlet and outlet passageways, a pilot burner having a fuel conducting tube in communication with the inlet side of said body, a cap for said tube formed from a hollow member having a port adapted for communication with said tube and having flame supporting orifices thereby supplied with fuel, adjustable means cooperating with said port for regulating the flow of fuel therethrough, a thermostat in said tube responsive to the heat of said burner, and a valve member operatively associated therewith for preventing the flow of fuel from the outlet passageway of said valve body upon the extinguishment of the flame of said pilot burner, and other means to effect the operation of said valve member when said pilot is burning and said thermostat is in a heated condition.

In testimony whereof I affix my signature.

EDMUND J. TEPAS.

CERTIFICATE OF CORRECTION.

Patent No. 1,842,329.　　　　　　　　　　Granted January 19, 1932, to

EDMUND J. TE PAS.

It is hereby certified that error appears in the printed specification of the above numbered patent requiring correction as follows: Page 4, line 33, claim 2, after "thereto" insert the words a thermostatic pilot burner mounted on the inlet side of said valve body above said valve head and arranged for constant communication with a source of gas supply, and a bimetal thermostatic element secured in the gas passageway of said pilot burner and projecting into the inlet side of said valve body for the purpose of shifting said valve head into engagement with its seat upon extinguishment of the pilot burner, said element normally being disconnected from said valve head during the operation of said pilot burner.; same page, line 47, claim 3, after the word "body" insert the words and arranged for constant communication with a source of gas supply, and a bimetal thermostatic element carried in the gas passageway of said pilot burner and projecting into the inlet side of said valve body where it is arranged to engage and shift said valve head to a closed position upon the extinguishment of said pilot burner, said element assuming an inoperative position with respect to said valve head when said pilot burner is burning.; and that the said Letters Patent should be read with these corrections therein that the same may conform to the record of the case in the Patent Office.

Signed and sealed this 22nd day of March, A. D. 1932.

(Seal)　　　　　　　　　　　　　　　　　　M. J. Moore,
　　　　　　　　　　　　　　　　　　Acting Commissioner of Patents.